William A. Monroe,
Homer C. Simons,
Inventors.

Koenig, Senniger,
Powers and Leavitt,
Attorneys.

United States Patent Office 3,262,534
Patented July 26, 1966

3,262,534
LIQUID-COOLED MAGNETIZABLE PARTICLE CLUTCH
William A. Monroe, Willoughby, and Homer C. Simons, South Euclid, Ohio, assignors to Eaton Yale & Towne Inc., a corporation of Ohio
Filed July 21, 1964, Ser. No. 384,119
4 Claims. (Cl. 192—113)

This invention relates to liquid-cooled magnetizable particle couplings, and with regard to certain more specific features, to automotive vehicular drives incorporating such couplings as clutches.

Among the several objects of the invention may be noted the provision of magnetizable particle coupling apparatus in which upon excitation the so-called pull-in time required for progressing from a slipping to a non-slipping or locked-up drive condition is minimized and in which pull-in forces are more constantly proportioned to applied control voltages; the provision of liquid-cooled automotive vehicular drive apparatus employing a magnetic particle coupling or clutch of the class described, which clutch advantageously employs liquid-cooling means of the automotive engine of the drive; and the provision of liquid-cooled apparatus of the class described requiring no sliding seals for sealing in its liquid coolant. Other objects and features will be in part apparent and in part pointed out hereinafter.

The invention accordingly comprises the elements and combinations of elements, features of construction, and arrangements of parts which will be exemplified in the constructions hereinafter described, and the scope of which will be indicated in the following claims.

In the accompanying drawings, in which one of various possible embodiments of the invention is illustrated, FIG. 1 is a horizontal section taken through an automotive vehicle clutch embodying the invention;

Corresponding reference characters indicate corresponding parts throughout the several views of the drawings.

Figure 2:
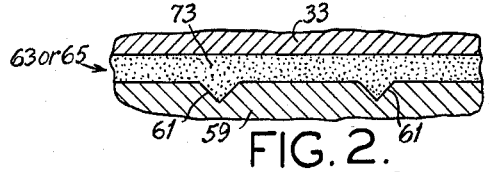
FIG. 2 is a greatly enlarged view of a part of the magnetic gap of the clutch under driving conditions.

Magnetic particle couplings or clutches have certain desirable characteristics for automotive vehicle applications, among which is the absence of undesirable so-called "grab" under vehicle starting conditions. Thus starting acceleration upon clutch engagement is similar in smoothness to that obtained with a hydraulic coupling. This is because in magnetic particle clutches static and slipping coefficients of friction are about the same under incipient lock-up conditions. Hence for a given magnetic field strength, the maximum torque which the coupling will transmit just before slipping begins is the same as at the start of slipping conditions.

Another advantage of the magnetic particle clutch is that, upon electrical deexcitation and clutch disengagement, arrangements can be made so that demagnetized particles move outward under centrifugal force to leave only an open air gap between the driving and driven elements of the clutch. The result is the absence of residual coupling drag, which is the case of liquid couplings would tend to cause vehicle creep.

Heretofore, magnetic particle clutches have been proposed for automotive use employing air cooling by means of fins, fan blades, scoops and the like, but these were not effective enough to offset one of the disadvantages of magnetic particle clutches for the above-mentioned uses or the like, particularly under extreme service conditions such as rapid clutching and declutching for maneuvering, in city and like driving of vans, industrial trucks, delivery vehicles and the like. The difficulties encountered with applications to such automotive vehicles, particularly in start-and-stop services, has been variable heating such that the resistance of the magnetic field coil increased variably, thereby in effect varially reducing its ampere turns at a given voltage. Under such conditions magnetic particles could not supply the torque for which the clutch was designed under the designed voltage. Moreover, during slip, increased scrubbing action occurred among the particles in the gap. This action entailed more friction than necessary and further increased the temperature, thus aggravating the reduction in ampere turns under a given voltage. All of these factors made difficult satisfactory design of such clutches for the stated type of automotive use. By means of the present invention, temperatures of excitation coils are maintained fairly constant, say under or at 200° F. or so (for example). Under such substantially constant temperature conditions the resistance of the coil wire at the stated temperature may be employed for basic calculations of torque requirements under slip and lock-up conditions with the assurance that such torque will be attained in practice. Stated otherwise, the ampere turns available for excitation will under all operating conditions, both summer and winter, bear a more direct proportion to applied control voltages, thus simplifying design of control circuits. Another advantage of the invention is that substantially predictable conditions are obtained under which either manual or automatic shifting occurs in transmissions used in automotive vehicles and for which appropriate control circuits may be more effectively designed.

Referring now more particularly to the drawings, there is shown at numeral 1 a typical liquid-cooled automotive engine suitably mounted on its vehicle frame 3. The radiator for cooling the engine 1 is indicated at 5. Inlet and outlet connections for the radiator 5 are shown at 7 and 9, respectively. Inlet and outlet coolant connections for the engine are shown at 11 and 13, respectively. A typical thermostat for controlling coolant temperature is indicated at 15. Such thermostats will normally maintain engine coolant temperatures below the boiling point of the coolant employed. In the common case of water, with or without permanent antifreeze mixtures, the temperature maintained is below 200° F. or so under atmospheric pressure. The exact temperature is not critical to the invention. What is important is that the temperature is maintained fairly constant below the boiling point of the coolant by the cooling systems ordinarily used, whether or not employing thermostats and/or pressures above atmosphere.

At numeral 17 is shown a typical transmission or torque converter, which may be of the manual or automatic shift type and which in the usual way is connected to the vehicle driving wheels through a suitable drive shaft, a differential gear and axle. The transmission 17 is connected with the crankshaft of the engine 1 through the magnetic particle clutch forming a feature of the invention and shown in general by numeral 19. An upper part of the casing of the clutch 19 which forms the connection with the engine 1 is shown at 21 in FIG. 4. This lies over and encloses the parts illustrated in FIG. 1.

Figure 1:
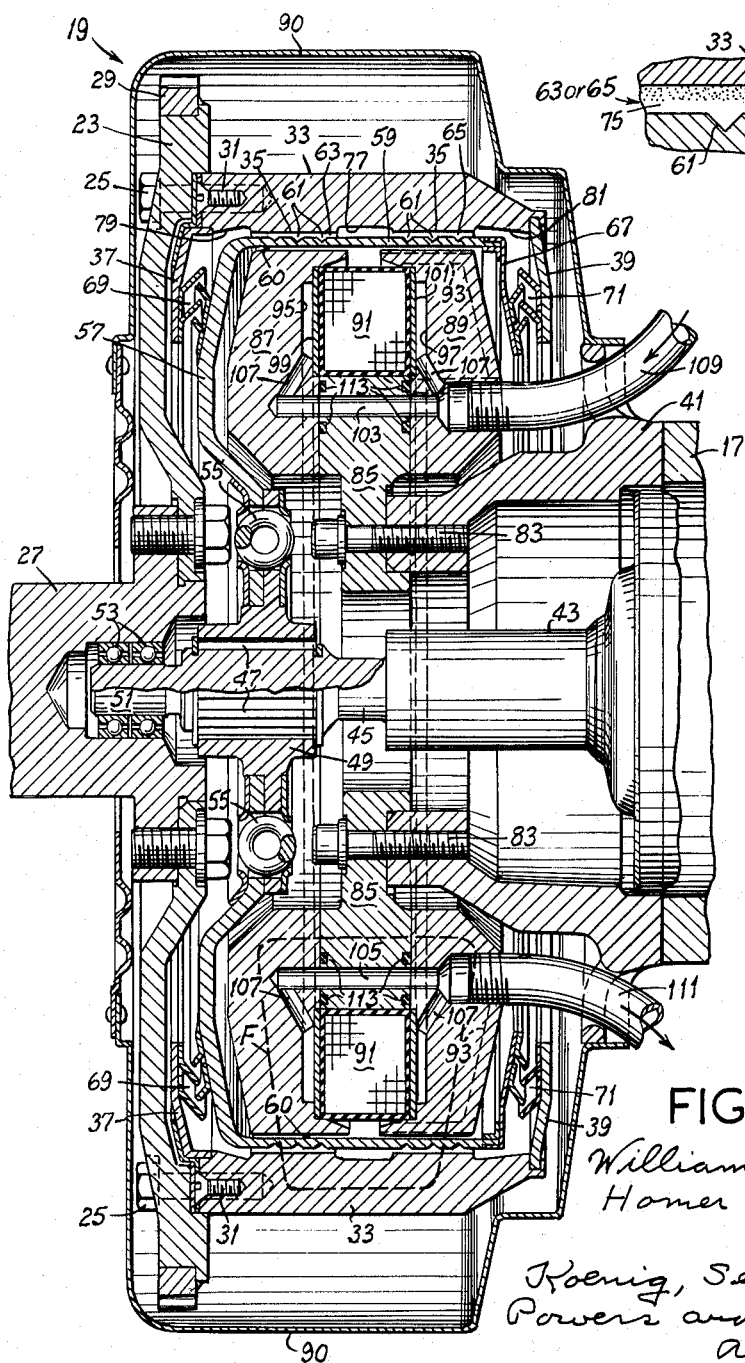

Referring to FIG. 1, this shows a flywheel 23, bolted as shown at 25 to the crankshaft 27 of the engine 1. The flywheel 23 carries the usual starter gear 29. Bolted to the flywheel as shown at 31 is a magnetizable hollow cylinder or drum 33, having two spaced interiorly smooth cylindrical gap-forming sections 35. Extending inwardly from opposite ends of the drum 33 are shrouds 37 and 39.

At 41 is shown an extension of the part 21 of the clutch 19. Part 41 is attached to the transmission 17 and part 21 is attached to the engine 1. Thus parts 21 and 41 are fixed. At the power input end of the transmission 17 is a bearing 43 for its input shaft 45, the latter having a splined connection 47 with a hub 49. The shaft 45 also has a stub end 51 carried in a pilot bearing 53 located in a pocket in the end of the crankshaft 27.

Spring-mounted on the hub 49 by vibration dampers 55 of conventional construction is a cup-shaped driven member 57 having a cylindrical sleeve portion 59. This sleeve portion is magnetizable and cylindrically formed, both exteriorly and interiorly. On its outside it is provided with groups of grooves 61 within the confines of the cylindrical sections 35 of the drum 33. Thus there are formed two magnetic gaps lettered 63 and 65. On its end opposite the radial cup-forming portion 57 the sleeve 59 is provided with an inwardly directed radial shroud 67. A free-running labyrinth sealing means 69 is provided between shroud 37 and member 57. A similar free-running labyrinth sealing means 71 is provided between the shrouds 39 and 67. Thus there is provided sealed-off space between the drum 33 and the sleeve 59 for the containment of finely divided magnetizable particles 73 of any appropriate material such as for example an appropriate stainless steel.

Figure 3:
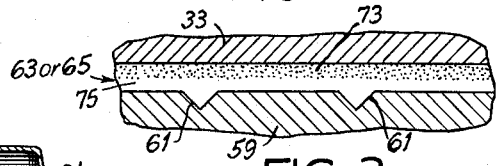
FIG. 3 is a view similar to FIG. 2, showing said gap under release conditions.

FIGS. 2 and 3, on an enlarged scale, illustrate the magnetic gaps 63 or 65 and the contained particles 73. In FIG. 2, the particles are shown in a magnetized condition and thereby drawn into the gap 63 or 65 so as to infill it, including the grooves 61, and to form a torque-transmitting driving connection between the parts 33 and 59. This may be a slipping connection upon partial magnetization of particles 73, or a locked-up nonslipping driving connection upon their sufficient magnetization. Upon demagnetization and rotation of the member 33, as upon idling of the engine 1, the demagnetized particles 73 will be thrown out by centrifugal force clear of the sleeve 59, so as to provide free-running air gaps as shown at 75 in FIG. 3. Under these conditions some of the particles may migrate axially to the spaces shown at 77, 79 and 81 in FIG. 1. Their escape from between members 37, 59 and 39, 67 in any appreciable quantity is prevented by the free-running labyrinth seals 69 and 71.

Magnetization of the particles 73 is provided for by a fixed electromagnetic pole arrangement as follows: Bolted as shown at 83 to the fixed member 41 is a central magnetizable ring 85. Bolted together on opposite sides of the ring 85 are magnetizable pole rings 87 and 89. The conventional holding bolts are not shown, being out of the drawing plane. The outer faces of rings 87 and 89 are substantially smooth and cylindrical, being located just within the inside cylindrical face of the sleeve 59, thus forming inner air gaps 60. Between the pole rings 87 and 89 is contained an annular field coil 91, the supply leads of which (for clarity in FIG. 1) are not shown, being carried, when emplaced, in suitable grooves 93 of pole ring 89. The leads are connected to suitable circuitry for supplying current to the coil 91 as desired under appropriately controlled voltage. Any of various appropriate control circuits may be used, further description being unnecessary.

Pole rings 87 and 89 are provided with annular coolant-circulating passages 95 and 97, respectively. These are closed off by sealed-in magnetic covering rings 99 and 101, respectively. These flank and engage the sides of coil 91. Drilled into the rings 85, 87, 89, in a horizontal plane, are coolant passages 103 and 105. Each of these passages 103 and 105 has a pair of connections 107 leading to the annular passages 95 and 97, respectively. A coolant inlet pipe 109 is connected with the passage 103, and a coolant outlet pipe 111 is connected with the passage 105. Thus coolant may flow in through pipe 109, passages 103 and 107 to the annular passages 95 and 97. The coolant then divides its flow around each side of the coil 91 (but out of wetting contact therewith), escaping through passages 107 and 105 to the outlet pipe 111. Rings 99 and 101 are highly heat-conductive, as well as magnetizable, a low carbon iron being used for example. Annular sealing rings 113 between ring 85 and rings 87 and 89 within and without the radius of passages 103, 105 prevent escape of liquid from the passages 103 and 105. A lower casing or pan 90 surrounds the clutch parts.

Figure 4:
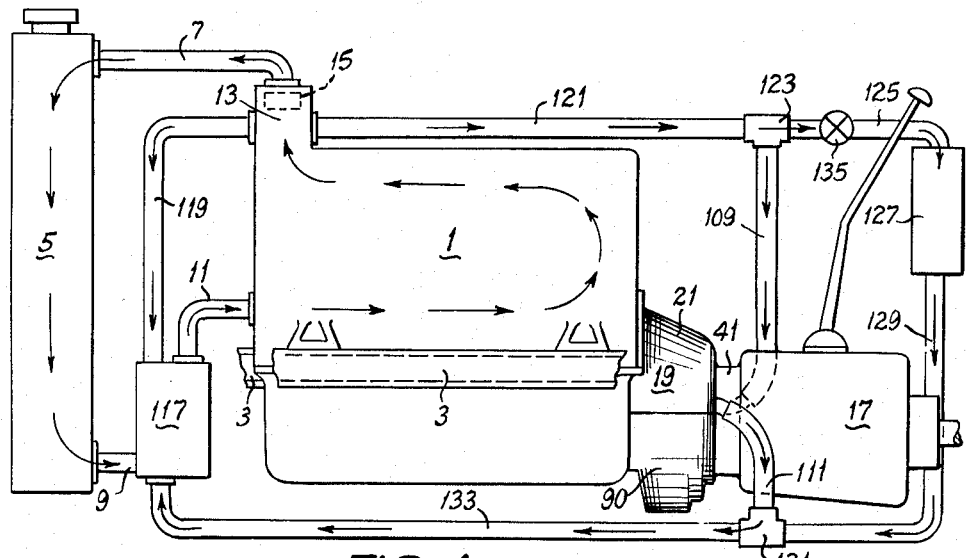
FIG. 4 is a diagrammatic side elevation showing a liquid-cooled automotive power plant in which the clutch shown in FIG. 1 is connected.

One form of hydraulic circuit for the coolant is shown in FIG. 4. Coolant from the bottom of the radiator 5 passes to a conventional engine-driven pump 117 and is delivered via inlet connection 11 to the engine 1. Ordinarily such a pump is attached to the engine block and belt-driven from the engine air-circulating fan, but these features, being conventional, are not shown. This coolant from pump outlet 11 circulates through the engine to the engine coolant outlet 13 where it divides, part passing through a conventional thermostat 15, connection 7 and back to the radiator 5. Some returns to the pump 117 through a by-pass 119. The remainder passes through a pipe 121 to a T fitting 123 forming branches, first to the inlet pipe 109 of the clutch, and second to an inlet pipe 125 to the inside heater 127 of the vehicle (if used). At 129 is shown a return connection from the heater 127 to return pipe 133 through a T connection 131. All fluid passing to the T connection 131 is returned to the pump 117 via pipe 133. The coolant that moves through the inlet pipe 109 passes through the fixed parts of the clutch 19, as above described, and then to the T fitting 131 through outlet pipe 111, ultimately returning to the pump 117 through the pipe 133. A valve 135 in pipe 125 permits the heater 127 to be taken out of circulation during warm weather.

Figure 5:
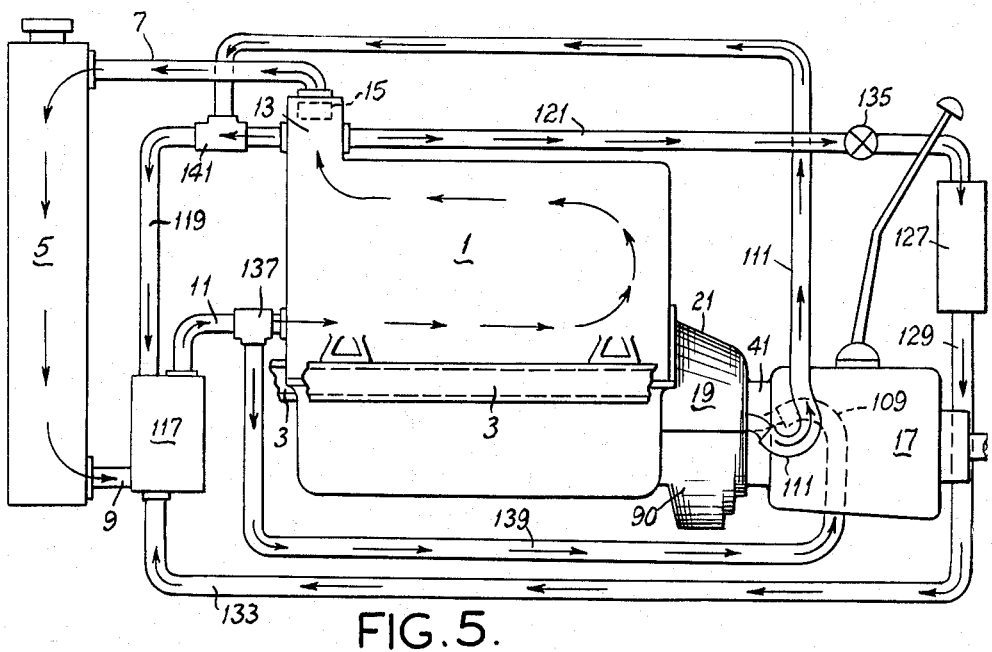
FIG. 5 is a view similar to FIG. 4, showing alternative cooling connections.

In FIG. 5 is shown a modified cooling circuit wherein like numerals designated like parts. In this case the T 131 is omitted and some of the coolant from the outlet 11 of the pump 117 is taken off at a T 137 and delivered via pipe 139 to the inlet connection 109 for circulation through the fixed parts of the clutch 19 and return through outlet connection 111, which in this case is coupled to the by-pass connection 119 at a T 141.

The circulation for each of the cooling systems shown in FIGS. 4 and 5 are shown by darts. It will be seen that in both, water from the radiator, after passing through the pump 117, is delivered to the clutch 19 for passage therethrough and return to the pump. However, in the case of FIG. 4, water in passing from the pump 117 to the clutch 19 passes through the block of the engine 1, whereas in FIG. 5 it does not. In other words, in FIG. 5 the coolant for circulation through the clutch by-passes the engine block. The circulating system shown in FIG. 5 is preferred. However, in both of the circulating systems a sufficiently constant temperature is maintained in the clutch for practical operations, because in each the coolant in the system is maintained at a substantially constant temperature because of the effect of the conventional thermostat 15. In both cases, upon start-up under frigid conditions the thermostat 15 restricts circulation through the radiator 5 so as to enforce a rapid rise in temperature of the coolant, including that passing to the clutch 19. As warm-up occurs, the thermostat 15 gradually opens, thus effecting coolant temperature control. During warm-weather operation, overheating does not occur under the then wide-open conditions of the thermostat 15, the cooling capacity of the radiator 5 being designed to accomplish this.

Operation is as follows:
When the engine 1 is started, it warms up rapidly to its operating temperature of the coolant of about 200° F., as determined by thermostat 15. Thus the coil 91 rapidly acquires and is kept at an approximately constant temperature.

With the coil 91 deexcited and the engine 1 idling, conditions in the gaps 63 and 65 are as illustrated in FIG. 4, there being no driving creep between the drum 33 and sleeve 59. When the coil 91 is excited, a toroidal flux field will be established around coil 91. An axial section through one side of this flux field is arbitrarily illustrated by the dotted lines F at the bottom of FIG. 1. This field crosses the gaps 60, 63 and 65. It draws the particles 73 into gaps 63 and 65, as illustrated in FIG. 3, during any partial or complete excitation of the coil 91. What may be referred to as the apparent viscosity of the particle 73 is not a maximum upon partial excitation, thus allowing torque transmission with slip. Upon complete excitation of the coil 91 to a value of ampere turns corresponding to the designed torque rating of the clutch, the apparent viscosity becomes such that there is no slip between the drum 33 and the sleeve 59. The clutch then delivers rated torque in the locked-up nonslip driving condition. Inasmuch as the coil 91 is maintained at a substantially constant temperature, the number of ampere turns (which controls the strength of the flux field supplied thereby) is substantially invariable at a given voltage, whether or not torque is being transmitted under slip or non-slip conditions. Hence any field controls depending upon voltage (applied for example through a rheostat) can be relied upon to deliver the torque expected at a selected voltage. This would not be true if the clutch 19 were permitted to rise and fall in temperature in accordance with loading, clutching and declutching action or other causes of temperature fluctuations. Another advantage is that transmission 17 is not subjected to undesired variable clutch functions which might adversely affect its shifting characteristics, particularly if the transmission is of the automatic type.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electromagnetic coupling comprising rotary driving and driven members, a hollow magnetizable drum connected with the driving member, a magnetizable sleeve member connected to the driven member and located within the drum to form outer gaps therewith, magnetizable particles movable to and from the outer gaps, a fixed member, a first magnetizable ring attached to said fixed member, an annular field coil surrounding said first ring, pole rings attached to said first ring, said pole rings flanking said field coil and having outer surfaces forming inner air gaps with said sleeve member, each pole ring having an annular recess adjacent the coil, a magnetizable heat-conductive ring between each side of the coil and the adjacent annular recess and sealed to its margins to enclose it, axially extending passages traversing the rings within the coil, the passages having oppositely disposed connections with said annular recesses, whereby liquid coolant may be circulated in close heat-exchange relationship with the coil to prevent excessive variations in temperature thereof.

2. A coupling according to claim 1, including running seals between the drum and the sleeve member for containing said particles therebetween, and coolant sealing means between said first and flanking rings to prevent leakage from said axially extending passages.

3. A power plant carried by and for driving an automotive vehicle, comprising a liquid-cooled engine, a radiator, a pump, a thermostat, liquid connections between said radiator, pump, thermostat and engine for substantially constantly cooling and minimizing variations in liquid temperature as temperature changes occur externally to the plant, a clutch having a driving member connected to the engine and having a driven member, a magnetizable drum attached to one of said members and a coaxial magnetizable sleeve connected to the other, magnetizable particles between the drum and the sleeve, a fixed coaxial pole ring assembly carrying an annular field coil for establishing a magnetic field through the drum, sleeve and particles, liquid-circulating passages in said pole ring assembly for cooling the coil, and connections with said first-named connections for circulating at least some of said substantially constantly cooled liquid through said liquid-circulating passages of the pole ring assembly, whereby variations in the electrical resistance, and ampere turns of the coil under a given voltage, will be substantially minimized as temperatures change external to the clutch.

4. A power plant carried by and for driving an automotive vehicle, comprising a liquid-cooled engine, a radiator, a pump, a thermostat, liquid connections between said radiator, pump, thermostat and engine for substantially constantly cooling the liquid and minimizing variations in its temperature as temperature changes occur externally to the plant, a clutch having a driving member connected with the engine and having a driven member, a magnetizable drum attached to the driving member, a magnetizable sleeve within the drum and connected with the driven member, magnetizable particles between the drum and the sleeve, a fixed pole ring assembly within the sleeve, an annular field coil carried by said pole ring assembly for establishing a magnetic field through the drum, sleeve and particles, liquid-circulating passages in said pole ring assembly adjacent said coil, and connections with said first-named connections for circulating at least some of said liquid through said liquid-circulating passages of the pole ring assembly, whereby variations in the electrical resistance, and ampere turns of the coil under a given voltage, will be substantially minimized as temperatures change external to the clutch.

References Cited by the Examiner

UNITED STATES PATENTS

| 2,440,551 | 4/1948 | Martin | 310—105 X |
|---|---|---|---|
| 2,743,800 | 5/1956 | Levinson et al. | |
| 2,791,308 | 5/1957 | Barrett et al. | 192—21.5 X |
| 2,821,271 | 1/1958 | Sanford. | |
| 3,176,809 | 4/1965 | Monroe | 192—21.5 X |

FOREIGN PATENTS 713,849  8/1954  Great Britain.

DAVID J. WILLIAMOWSKY, *Primary Examiner.*